United States Patent Office 3,260,533
Patented July 12, 1966

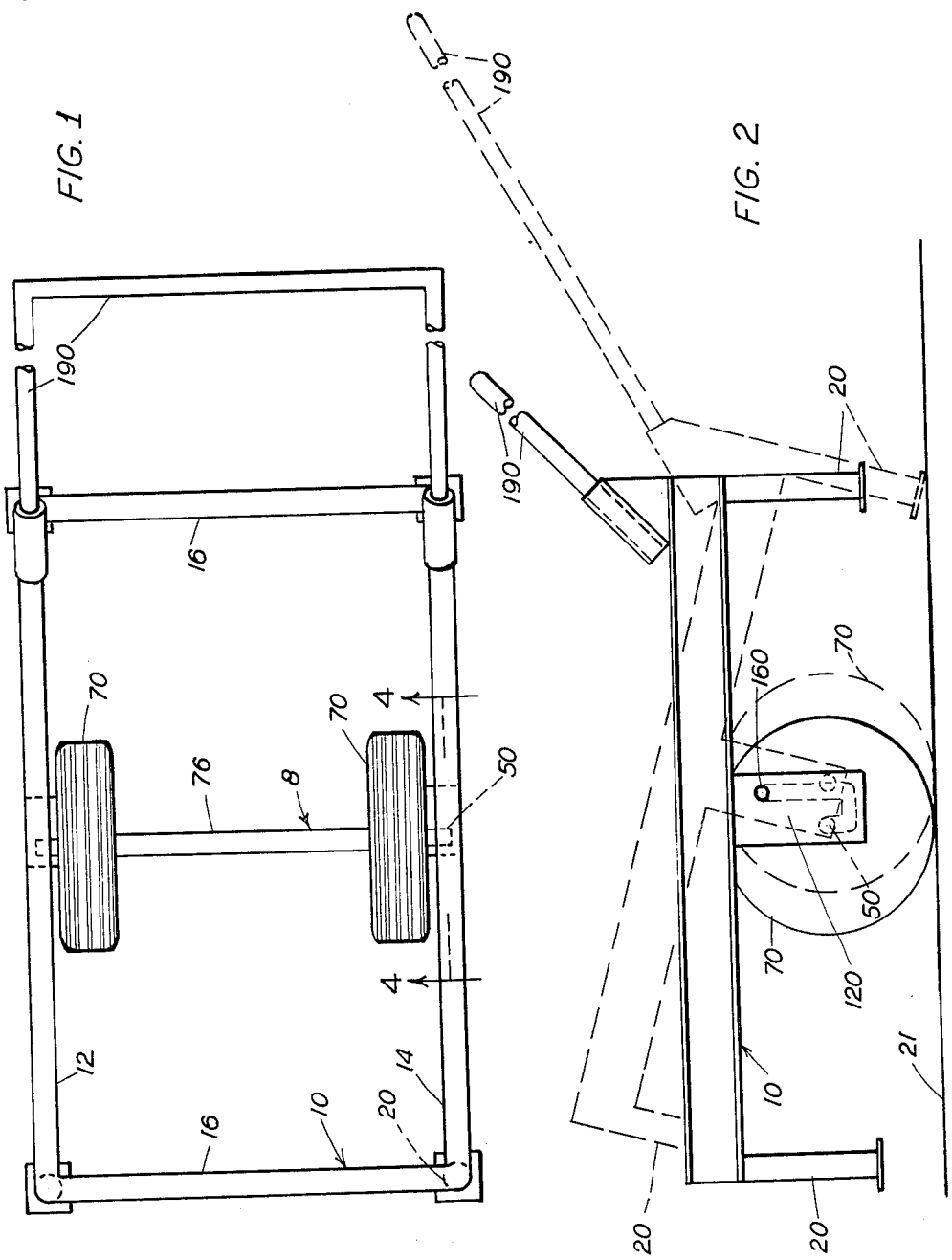

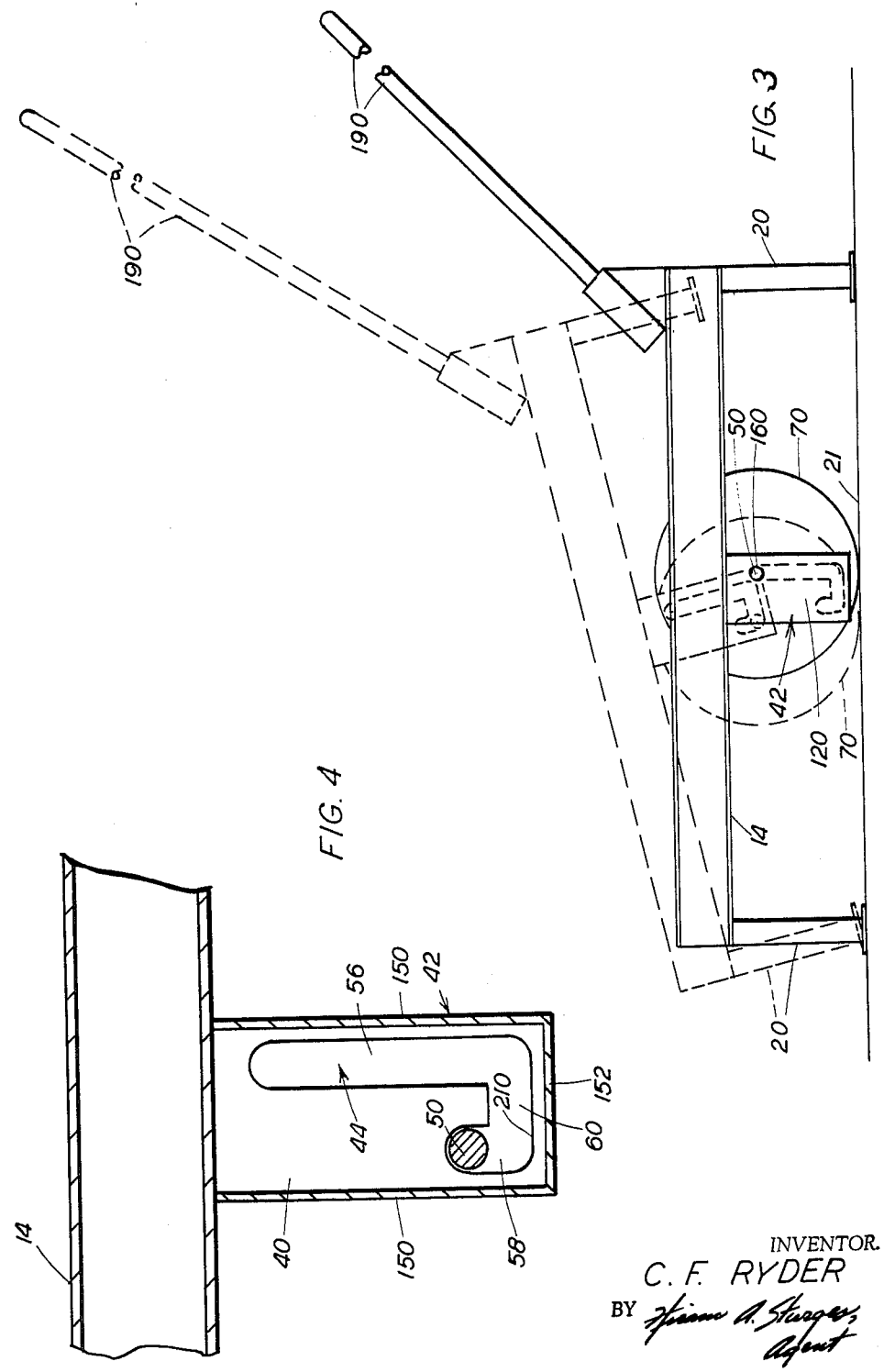

3,260,533
RETRACTABLE WHEEL ASSEMBLY
Charles F. Ryder, Gordon, Nebr.
Filed Nov. 12, 1963, Ser. No. 322,594
1 Claim. (Cl. 280—43.1)

This invention relates to retractable wheel assemblies, and more particularly it is an object of this invention to provide a retractable wheel assembly for supporting a framework in which the wheel assembly is adapted to be shifted from a wheel use position to a wheel retracted position with a minimum effort and a maximum of simplicity through the lifting of one end of the framework while an opposite end is supported on a floor with the axle of the retractable wheel assembly shifting from retracted to use position by the operation of gravity while the frame is so upheld.

A further object is to provide a handle telescopically attached to a framework in a position such that when a handle is pulled from a retracted to a use position, the handle moves from compact storage to a use position providing sufficient leverage for the tilting of the frame, even though the frame might be supporting a power tool or other object of considerable weight.

Still another object is to provide a wheel assembly as described, certain slotted housings of which are substantially completely enclosed except for certain necessary slots so as to prevent foreign material from entering the housings.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 1 is a top plan view of a framework of this invention shown with the retractable wheel assembly attached thereto so as to make it portable.

FIGURE 2 is a side elevation of the parts shown in FIGURE 1 and showing in full lines the positions the parts are in during use of the wheels for transportation and showing in dotted lines the position of parts at times when the axle has been released from wheeled transport position, the axle being disposed in longer sections of a slot for movement into position for nonsupport by the wheels for support of the frame on its own legs, parts of a handle being broken away.

FIGURE 3 is a view similar to FIGURE 2 but showing in full lines the position of parts during support of the framework on its own legs with the wheels in nonsupport position; FIGURE 3 showing in dotted lines the position of parts as the axle is moved by gravity into a position directly under a slot position for receiving the axle during wheel support for portability.

FIGURE 4 is a sectional view taken along the line 4—4 of FIGURE 1 showing the axle in position for wheel support of the frame.

Referring to FIGURE 1, the retractable wheel assembly of this invention is there generally indicated at 8, shown supporting a framework, generally indicated at 10, which latter is to be made portable. The framework 10 has two side pieces 12 and 14 interconnected by any suitable other framework members 16. The framework 10 has four supporting legs 20, having their lower ends disposed in a single plane for upright support of the framework 10 above a floor 21 as seen in FIGURES 2 and 3.

In accordance with this invention a pair of upwardly extending horizontally spaced axle receiving plates 40 are provided as best seen in FIGURE 4, each plate forming an inner side of a box 42, there being one box 42 disposed on each side of the framework 10. The plates 40 are attached to the respective framework members 12 or 14, as best seen in FIGURE 4, and the plates 40 are horizontally spaced so as to be on the right and left sides of the framework 10 respectively, preferably midway between forward and rearward ends of the frame 10, which latter are represented by the frame members 16 respectively. Each of the plates 40 has an axle slot 44 therein for receiving a respective opposite end of an axle 50, as best seen in FIGURE 4. Each slot 44 has first and second upwardly extending slot portions 56 and 58 disposed forwardly and rearwardly of each other respectively. The slot 44 also having an interconnecting slot portion 60 interconnecting a lower part of the first slot 56 with the lower part of the second slot 58. The first slot portion 56 extends upwardly beyond the second slot portion 58 a substantial distance, which latter is at least as great as the radius of wheels later described.

Two wheels 70 are rotatably mounted one adjacent each end of the axle 50 for rotation on the axle 50. The wheels 70 are, therefore, on the right and left hand sides of the framework 10 and are held outwardly adjacent the boxes 42 by a tube or sleeve 76 disposed around the axle 50 and having a diameter larger than the inner diameter of the wheels 70.

Suitable means are provided for preventing axle 50 from sliding outwardly of the respective plates 40 at undesired times such means preferably being provided by backing or cover plates or outside plates 120 disposed one on the outside of each of the axle-receiving plates 40 and spaced outwardly from each axle-receiving plate 40 a short distance.

The above mentioned boxes 42 also have end walls 150 and a bottom wall 152 all secured to the plates 40 and 120.

The method of assembly is first to pass the axle 50 through an opening 160 which extends horizontally through the left cover or backing plate 120 opposite the upper end of a J-slot first upwardly extending portion 56. The axle 50 is then passed through a wheel 70, the sleeve 76, the opposite wheel 70, then through the opposite first slot portion 56, and it cannot pass further because it cannot pass through the opposite backing plate 120.

In operation, the framework 10 is rested on the floor 21 on its legs 20, which latter have under surfaces lying in the same horizontal plane, the leg-supported position being illustrated in dotted lines in FIGURE 3 for providing the frame with stability so that it cannot roll on its wheels. The wheels 70 do not support the frame during such leg-supported position because the slots 56 extend upwardly from the plane of the bottom of the legs 20 a greater distance than the radius of the wheels.

To change to a wheel-supported position, the operator lifts upwardly on the framework 10 by lifting a handle 190 on that end of the framework 10 which is adjacent the longer first upwardly extending slot portion 56.

During such lifting toward the position as shown in dotted lines in FIGURE 3, the axle 50 drops downwardly in the first slot portion 56, rolls by gravity along the horizontal smooth bottom wall 210 of the interconnecting slot portion 60 until it is disposed at the bottom of the second slot portion 58, whereupon a lowering of the handle 190 will cause the plates 40 to move downwardly for receiving the axle 50 in the upwardly extending second slot portions 58 and in portions extending above interconnecting slot portions 60.

Thereafter upon the holding of the framework 10 in position for the bottoms of the legs 20 to be horizontal will cause the lower ends of the legs to be disposed above the bottom of the wheels 70, as shown in full lines in FIGURE 2.

Thereafter the device is in the wheel-position for portability.

Referring to FIGURE 2, it will be seen that to remove parts from the wheel-supported position, the operator presses downwardly upon handle 190 using the adjacent legs 20 as a fulcrum in engagement with the floor 21, whereupon the opposite or forward end of the framework 10 is raised for allowing the axle 50 to drop until it has rolled into the first slot position 56, whereupon the placing of the frame in a level position again will cause the legs to settle down with the plates 40 moving downwardly with respect to the axle 50, whereupon the wheels no longer support the frame or, in another sense, the legs are lower than the wheels.

As thus described it is believed that the above description fulfills the objectives above set forth in providing a more effective retractable wheel assembly.

From the foregoing description, it is thought to be obvious that a retractable wheel assembly constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

A retractable wheel assembly for supporting a frame work to be made portable, said frame work having forward and rearward end portions adapted to engage an axle, a pair of upwardly extending horizontally spaced axle receiving plates disposed in horizontally spaced positions and attached to said frame work, each of said plates having a slot therein receiving a respective end of said axle and having first and second upwardly extending slot portions, said slot further having an interconnecting slot portion interconnecting a lower part of said first slot with a lower part of said second slot, said first slot portion extending upwardly beyond said second slot portion, each said second slot portion extending upwardly beyond adjacent parts of its said interconnecting slot portion a substantial distance for retaining said axle during travel of said framework against forward and rearward motion with respect to said slotted plates, horizontally disposed wheels mounted on said axle, means for holding said wheels in horizontal positions along said axle, and backing plates disposed outwardly of each end of said axle respectively, means attaching said backing plates to said framework, the space between said slotted plates being closed along all outer edges of said plates to hold out foreign material, said backing plates being disposed opposite the majority of the area of said slots, said axle and said backing plates being so positioned that said backing plates prevent excess horizontal movement of said axle in areas of said slots disposed alongside portions of said backing plates such as would cause it to come out of one of said slots, said frame being provided with a handle which is disposed closer to the longer upwardly extending portion of said slot than to the shorter upwardly extending portion thereof whereby upon the lifting of said handle the corresponding end of said frame will be lifted while pivoting about the lower parts of the opposite end of said frame for causing a dropping of said axle from said longer upwardly extending portion of said slot through the connecting portion of said slot to the shorter upwardly extending portion of said slot, said handle projecting from the corresponding end of said frame, said handle being sufficiently long for materially assisting a tipping of said frame about one of its ends.

References Cited by the Examiner

UNITED STATES PATENTS

| | | | |
|---|---|---|---|
| 736,697 | 8/1903 | Cummins | 280—43 X |
| 1,537,673 | 5/1925 | Hillyard | 242—55.2 |
| 2,358,007 | 9/1944 | Henley | 280—47.32 X |

FOREIGN PATENTS

| | | |
|---|---|---|
| 459,767 | 9/1949 | Canada. |
| 1,016,887 | 11/1952 | France. |
| 561,353 | 5/1944 | Great Britain. |

BENJAMIN HERSH, *Primary Examiner.*

C. C. PARSONS, *Assistant Examiner.*